(12) United States Patent
Sartorius et al.

(10) Patent No.: US 11,148,781 B2
(45) Date of Patent: Oct. 19, 2021

(54) AIRFRAME ATTACHMENTS

(71) Applicant: Skydio, Inc., Redwood, CA (US)

(72) Inventors: Thomas Skyler Sartorius, Los Angeles, CA (US); Calder Richmond Hughes, Portland, OR (US); Julian Rene Alvarez, San Francisco, CA (US); Sean David-Andrew Belardo, San Francisco, CA (US)

(73) Assignee: Skydio, Inc., Redwood City, CA (US)

( * ) Notice: Subject to any disclaimer, the term of this patent is extended or adjusted under 35 U.S.C. 154(b) by 366 days.

(21) Appl. No.: 15/699,832

(22) Filed: Sep. 8, 2017

(65) Prior Publication Data

US 2018/0072398 A1 Mar. 15, 2018

Related U.S. Application Data (60) Provisional application No. 62/385,495, filed on Sep. 9, 2016.

(51) Int. Cl.
*B64C 1/26* (2006.01)
*B64C 3/28* (2006.01)
*B64C 3/56* (2006.01)

(52) U.S. Cl.
CPC ............. *B64C 1/26* (2013.01); *B64C 3/28* (2013.01); *B64C 3/56* (2013.01)

(58) Field of Classification Search
CPC .................................. B64C 1/26; B64C 3/28
See application file for complete search history.

(56) References Cited

U.S. PATENT DOCUMENTS

| 8,894,004 B1* | 11/2014 | Scott | F42B 10/14 244/49 |
|---|---|---|---|
| 2009/0302159 A1* | 12/2009 | Pajard | B64C 1/26 244/124 |
| 2011/0009026 A1* | 1/2011 | Feng | A63H 33/18 446/46 |
| 2018/0057136 A1* | 3/2018 | Haley | A63H 27/001 |

* cited by examiner

*Primary Examiner* — Jessica B Wong
(74) *Attorney, Agent, or Firm* — Young Basile Hanlon & MacFarlane, P.C.

(57) ABSTRACT

Disclosed here are airframe component assemblies including example embodiments with a root connected to an aircraft fuselage, a free section with a connection portion with holes, a slidable attachment section formed to fit between the root and the free section, and an elastomeric retention device coupled to the root and the slidable attachment section, the elastomeric retention device configured to exert a force to pull the slidable attachment toward the root.

8 Claims, 6 Drawing Sheets

AIRFRAME ATTACHMENTS

CLAIM OF BENEFIT TO PRIOR APPLICATIONS

This application claims priority to United States Provisional Patent Application Ser. No. 62/385,495, filed Sep. 9, 2016, the contents of which is incorporated by reference herein in its entirety.

TECHNICAL FIELD

This application relates to the field of aviation and flying machines including airframe component parts and attachments for the same.

BACKGROUND

Previously, moving and removing parts of fixed wing and rotor aircraft, including drones and models, required a myriad of attachments that could hinder the flight characteristics of the aircraft or present structural weaknesses.

Such parts required tools and fasteners that could come dislodged, get lost or otherwise foul the aviation environment. It is therefore useful to solve these problems with better attachments of the various airframe component parts.

SUMMARY

Systems and methods here include aircraft component connection assemblies, with some embodiments including an aircraft fuselage, at least one wing mounted to the aircraft fuselage, wherein the at least one wing mounted to the aircraft fuselage includes, a wing root component part and a detachable free wing section configured to connect to the wing root component by a slidable wing attachment section, and a tail mounted to the aircraft fuselage.

Systems and methods here include improved wing spar assemblies and connectors. Some embodiments include a wing assembly with a wing root connected to an aircraft fuselage, the wing root having a leading edge, a trailing edge, a protrusion forming a cut out space, the protrusion having at least two holes, a free wing section with a bracket, the bracket formed to fit into the wing root cut out space, the free wing section bracket including at least two holes, a slidable wing attachment section formed to fit between the wing root and the free wing section, and an elastomeric retention device coupled to the wing root and the slidable wing attachment section, the elastomeric retention device configured to exert a force to pull the slidable wing attachment section toward the wing root.

BRIEF DESCRIPTION OF THE DRAWINGS

For a better understanding of the embodiments described in this application, reference should be made to the Detailed Description below, in conjunction with the following drawings in which like reference numerals refer to corresponding parts throughout the figures.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments.

Overview

Fixed wing and rotary aircraft are typically designed with an airframe that includes a fuselage which may be used to carry a payload, a tail section with a horizontal and vertical stabilizer or combination elevator/rudder, used to maneuver the aircraft, and for fixed wing aircraft, wings used to generate the main lifting forces for the aircraft along with maneuvering flight surfaces. The final design of such fixed wing aircraft can be large and unwieldy to maneuver on the ground, as their parts are built for aerodynamic purposes and not storage or ground maneuvers.

Some kinds of fixed wing aircraft may have components that may be broken down in order to make them easier to maneuver and store on the ground. For example, U.S. Navy aircraft such as the EA-6B Prowler have wings capable of folding when on the ground in order to allow them to park closely aboard an aircraft carrier. Smaller aircraft such as models and drones may also include component parts capable of being disassembled in order to make handling and storage easier. This disclosure includes many embodiments of airframe component parts capable of quick disassembly and assembly.

Figure 1:
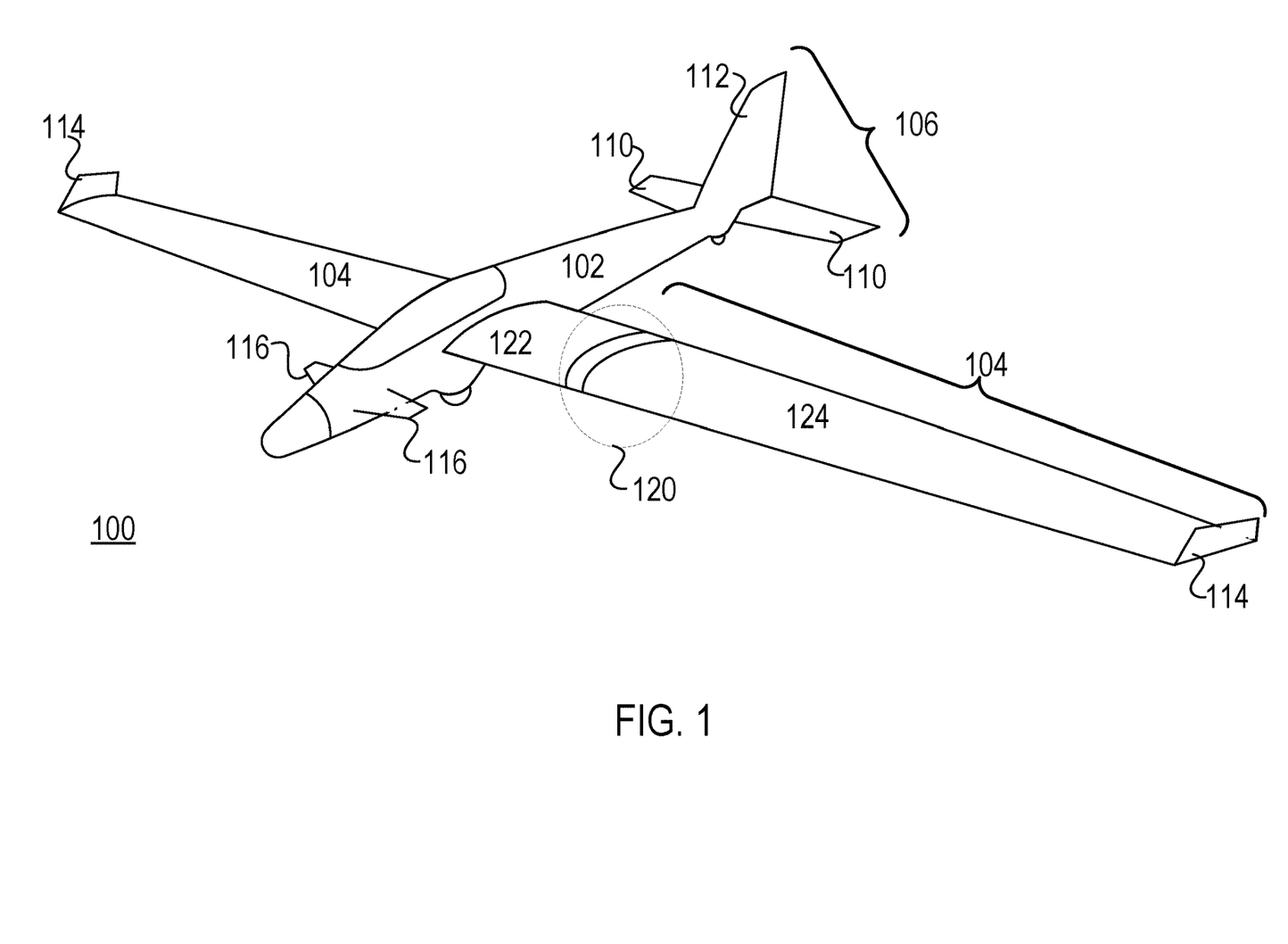
FIG. 1 is a perspective illustration of a fixed wing aircraft according to some embodiments described here.

FIG. 1 shows an example fixed wing aircraft 100 with a fuselage 102, wings 104, and tail 106 sections. Disclosed here are various embodiments for quick connectors and attachments 120 that can allow an operator to assemble and disassemble aircraft components such as wings 104, fuselage 102, and tails 106, as well as sub-components of these without need of tools, adhesives or extra parts to carry or fall off. Such embodiments allow a structurally sound aircraft to fly while allowing the ease of quick assembly and disassembly when not in flight.

In the example of FIG. 1 the wing root 122 section is a short section of the overall wing 104 which is nearest to the fuselage 102 and attached to the fuselage 102. The entire wing 104 includes the free wing 124 which may be attached to the wing root 122. This disclosure includes many examples which detail embodiments for disassembling and assembling wing 104 portions of aircraft 100. Similar embodiments may be employed on other parts of the aircraft 100 such as, but not limited to, sections of the fuselage 102, tail 106 section including horizontal stabilizer 110, vertical stabilizer 112, combination horizontal/vertical stabilizer 110/112, and optional components such as winglets 114 and canards 116. The examples of attachments 120 described here, pertaining to only a wing 104 section are therefore not intended to be limiting.

Slidable Attachment Examples

Figure 2A:
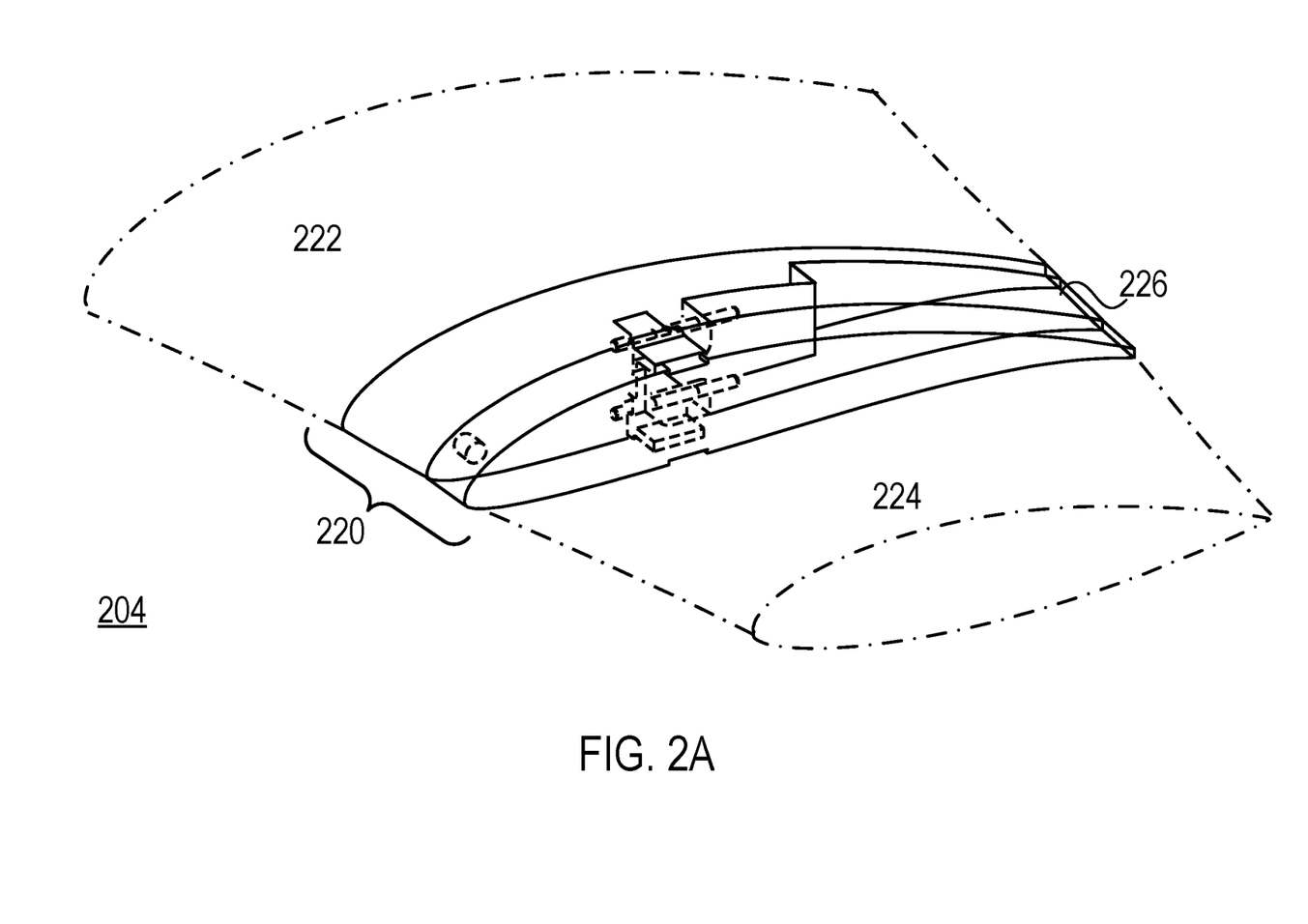
FIG. 2A is a perspective illustration of a wing spar assembly according to some embodiments described here.

FIG. 2A shows an example perspective detail view of the wing attachment section 120 from FIG. 1 including the overall wing 204 and the portions of one wing attachment assembly 220 section in detail and cut away. FIG. 2A shows the wing attachment assembly 220 as a portion of two wing segments: a wing root 222 section and a free wing 224 section held together by a slidable wing attachment 226 section. In a disassembled arrangement, the wing root 22 would be sticking out on either side from the fuselage 102 from FIG. 1 while the free wing 224 portions could be removed for storage.

The example of FIG. 2A shows an assembled wing 204 where all three parts 222, 224, 226 are attached to one another as described herein. The wing portions for the wing root 222 and the free wing 224 are cut away views and are not shown in their entirety. The wing root 222 for example could be any length, extending away from the fuselage of the aircraft. Likewise, the free wing 224 section could have any length of wing extending outward away from the fuselage, and could take any shape depending on the aircraft design. In some embodiments, users may replace the free wing 224 section with a longer or shorter wing, or differently shaped wing such as with a winglet.

Figure 2B:
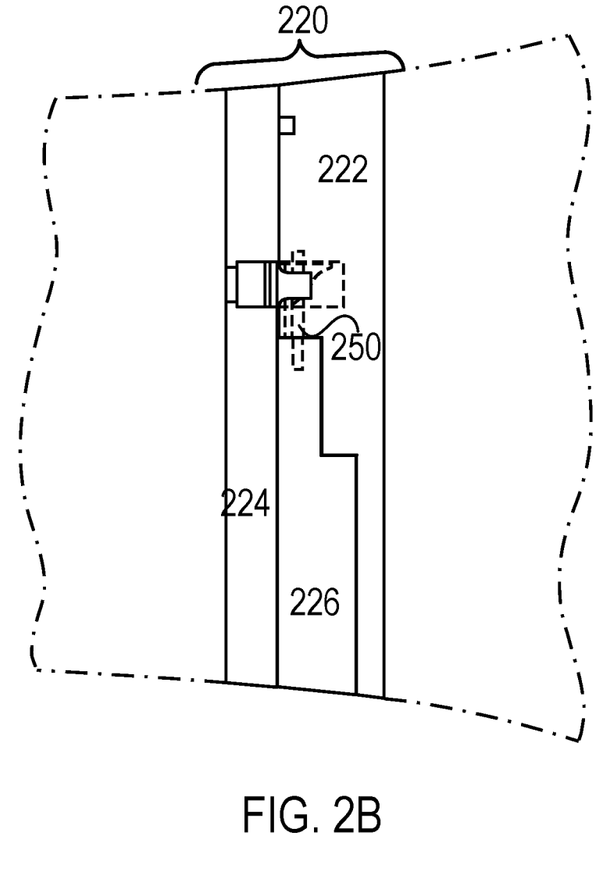
FIG. 2B is top down illustration of an assembled wing spar assembly according to some embodiments described here.

FIG. 2B shows a top down view of an example wing assembly 220 in a fully assembled arrangement. In the example, the wing root 222 is connected to the free wing 224 sections by the slidable wing attachment 226 and its corresponding rods 250. The spring force exerted by the spring (not shown) on the slidable wing attachment 226 holds the rods 250 that run through and attach the wing root 222 to the free wing 224 sections as described herein.

Figure 3:
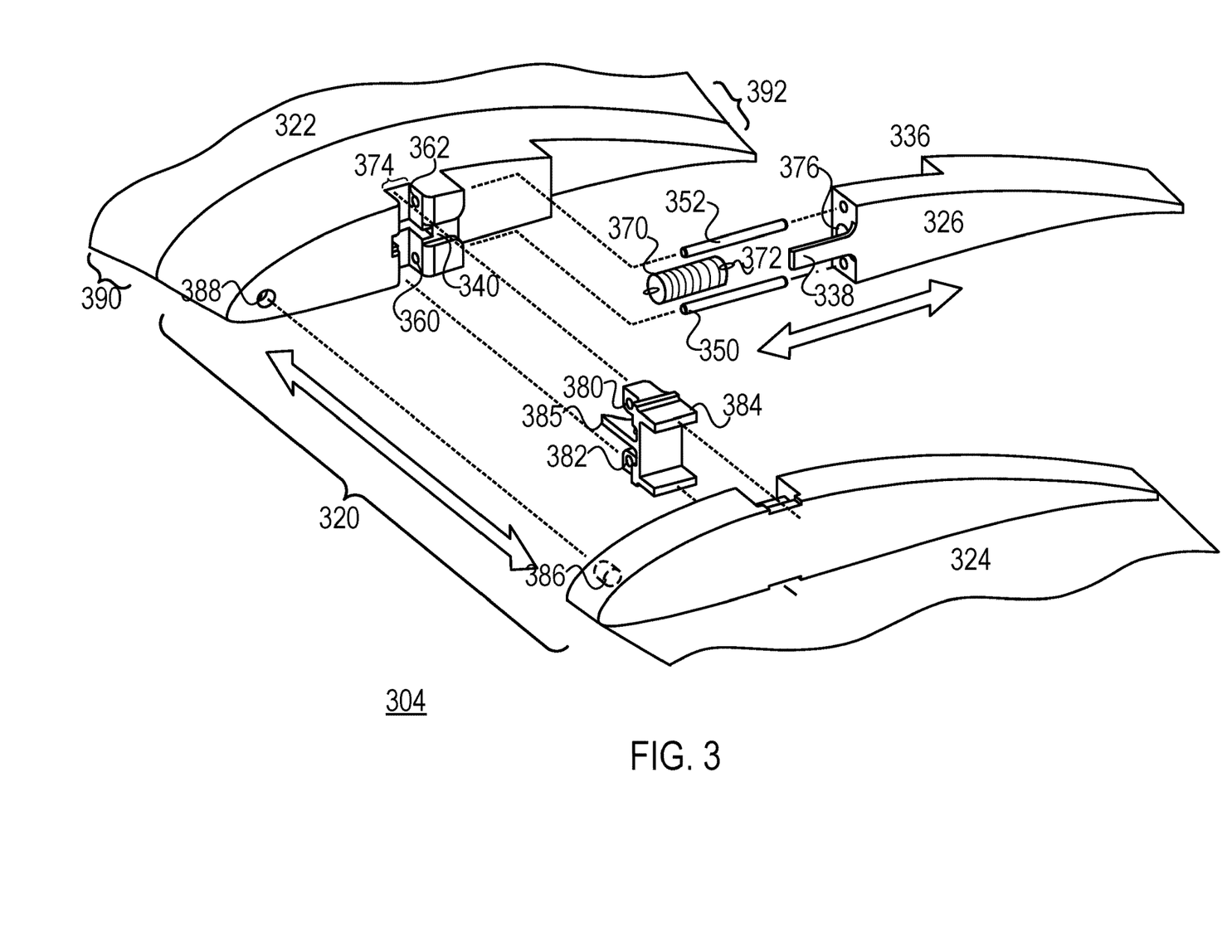
FIG. 3 is an exploded view illustration of a wing spar assembly according to some embodiments described here.

FIG. 3 shows a perspective view of an example wing 304 with exploded details on the wing attachment assembly 320 example embodiment. FIG. 3 shows an example with the wing root 322 where it would be attached to a fuselage (102 from FIG. 1) and the free portion of the wing 324 is shown extending away from the fuselage (102 from FIG. 1).

FIG. 3 also shows three main example components in the wing assembly 320: the wing root 322 attached to the fuselage (102 from FIG. 1), the free wing section 324 and a slidable wing attachment 326. As described herein, these three component parts may be joined together, in some embodiments, to attach the free wing 324 to the wing root 322 and slidable wing attachment section 326 to for a full wing 304 for flight operations. When disassembled, the slidable wing attachment 326 may be mounted to the wing root 322 in a slidable fashion, with rods 350, 352 affixed to the slidable wing attachment 326 configured to slide into holes 360, 360 in the wing root 322 and an elastomeric connection such as a tension spring 370 mounted to the sections to pull the slidable wing attachment 326 toward the wing root. In the example, the elastomeric connection 370 is configured to pull the slidable wing attachment section 326 toward the forward edge 390 of the wing root 322 but other arrangements could be configured as described herein.

In an example embodiment, the slidable wing attachment 326 may be pulled back by a user, toward the trailing edge 392 of the wing 304. When the slidable wing attachment 326 is pulled back in these examples, the tension spring 370 in the example of FIG. 3, elongates and the rods 350, 352 slide back through the holes 360, 362 in the wing root 322. Pulling the slidable wing attachment 326 toward the trailing edge 392 may leave a space 374 for a bracket 384 mounted on the free wing 324 section to fit into. The slidable wing attachment 326 may then be released by the user, allowing the tension spring 370 to draw the slidable wing attachment 326 forward, toward the leading edge 390 of the wing root 322 and thereby pull the rods 350, 352 back through the holes 360, 362 in the wing root 322 and through the corresponding holes 380, 382 in the bracket 384 mounted on the free wing 324 section. In the forward position in this example, the rods 350, 352 would hold the free wing 324 section to the wing root 322 and the tension spring 370 would hold the slidable wing attachment 326 forward, toward the wing root 322.

In some example embodiments, other structures may be built into the wing root 322, free wing section 324 and/or the slidable wing attachment 326 in order to provide more load bearing structures for flight. The example of FIG. 3 includes a protruding button 386 on the free wing section 324 and the wing root 322 is shown with a recessed button cavity 388 that matches the size and shape of button 386 to allow the button 386 to slide into the button cavity 388 when assembled. Such an arrangement may provide additional structural support to the assembled wing segments 322, 324, 326. The example of one such button 388 arranged as in FIG. 3 is not intended to be limiting, in some embodiments, such structures could be arranged in any number of places along the wing sections 322, 324, 326 so that when assembled, loads are distributed to these structures and the sections 322, 324, 326 may hold together. Such an arrangement may also include buttons 386 and matching button cavities 388 on the opposite wing sections as shown here, and may be arranged in alternating fashion, to provide further support to the assembled wing assembly 320. Thus, an embodiment may include buttons 386 and matching button cavities 388 on both the wing root 322 and the free wing 324 as well as the slidable wing attachment 326 in various combinations. The use of the term button is not intended to be limiting. In some embodiments, instead of or additional to a button and button cavity could be another kind of structure such as but not limited to a rod and slot, tongue and groove, hook and loop, magnets, or other connection devices.

The slidable wing attachment 326 example embodiment shown in FIG. 3 also shows a guide post 338 as part of the structure to keep the wing root 332 and free wing 324 sections held together. The guide post 338 may also act as a surface that the bracket 384 curved surface 385 pushes against to move the slidable wing attachment 326 in a quick connect example as described below. The example shows the guide post 338 configured to slide into the wing root 332 along a gap 340. In some embodiments, the guide post 338 may be arranged on the wing root 332 instead of the slidable wing attachment 326. The guide post 338 could take any shape so long as the opposing side, the gap 340 allows the guide post 338 to slide into it or past it. Example shapes include, but are not limited to, a rectangular post, a cylindrical post, a prismatic post, a triangularly shaped post, or other shape such as a T-shape, I-beam shape or other structure to help guide the wing portions together.

Regarding the structural shape of the wing attachment assembly 320, in some embodiments, the structure of the slidable wing attachment 326 includes a step feature 336 which joins with the wing root 332 when assembled. The step 336 could include any number of features such as its own rod, its own guide post, its own spring system, button and button cavity, a magnetic assembly or other connection assembly to help the slidable wing attachment 326 and wing root 332 bias toward one another and/or slide together in operation.

Alternatively or additionally, embodiments may include other arrangements of the wing sections. For example, in the example of FIG. 3, the slidable wing attachment 326 is shown on the trailing edge 392 of the overall wing assembly 304. In some embodiments, the slidable wing attachment 326 may be on the leading edge 390 of the wing assembly 304. In some examples, the slidable wing attachment 326 could be mounted in the middle of the wing assembly 304 and slide in a perpendicular direction up or down on the wing assembly 304 instead of forward toward the leading edge 390 or rearward toward the trailing edge 392.

To further illustrate the configuration of the rods, still referring to the example of FIG. 3, the example embodiment shows structural elements which may slide together to form the overall wing assembly 304 and secure the wing root 332 to the free wing portion 324. In the example, the slidable wing attachment 326 includes two rods 350, 352 which are mounted to the slidable wing attachment 326 and extend outward.

The rods 350, 352 are configure to not only be able to slide into the holes 360, 360 in the wing root 332 but also into receiving holes 380, 382, in a bracket assembly 384 in the free wing 324 portion. In such a configuration, the rods 350, 352, thereby connect the wing root 332 to the free wing portion 324 by the rods 350, 352 in the slidable wing attachment 326.

Mounting the rods 350, 352 could take many forms. For example, in some embodiments, the rods 350, 352 may be fixably mounted in the slidable wing attachment 326 and in some examples, may be fixably mounted in the portion of the wing root 332 instead. In some examples, one or more rods 350, 350 are mounted in each section 322, 326. The number of rods can be more or less than two that are shown in the example of FIG. 3. Further, the size, material, and arrangement of the rods 350, 352 in the wing root 332 and/or the slidable wing attachment 326 could be different than is shown in FIG. 3, such as for example, in some embodiments, there could be three rods, with one fixed in the wing root 332 and two in the slidable wing attachment 326. In some examples, there could be three rods, with two fixed in the wing root 332 and one in the slidable wing attachment 326. Four rods could be used, or even just one rod. Any number of rods could be used in a similar fashion as that shown in FIG. 3.

The rods 350, 352 which are used to secure the wing assembly 304 together could be made of many material such as but not limited to metal such as aluminum, titanium or steel, ceramic, plastics, Kevlar, carbon fiber, or other material. The rods 350, 352 could be affixed into the wing portions 332, 324, 326 by any of various glues, adhesives, cement, solder, or could be molded or printed out of the same material as the wing assembly 304 itself.

In whichever arrangement the rods 350, 352 are arranged in the wing root 332 and/or the slidable wing attachment 326, the opposite portion would include a receiving hole(s) that matches where the rod(s) on the opposing portion to be inserted to secure the wing assembly 304 together. In such an arrangement, the rods 350, 352 and receiving holes 360, 362 would line up so as to engage one another when the wing root 332 and slidable wing attachment 326 are joined, coupled, mounted, etc.

The use of the term rods is not intended to be limiting. The rods could take any number of shapes such as but not limited to: a square rod, a round rod, an I-beam, a T-shaped beam, a hexagonal post, a hollow rod, or any other kind of post or rod.

Still discussing FIG. 3, in some embodiments, the wing root 332 and the slidable wing attachment 326 may be attached in some manner in order to help speed the assembly of the wing. In such examples, an elastomeric device such as a tension spring 370 or other elastic portion may be used to connect the wing root 332 and the slidable wing attachment 326 to one another. In such examples, the tension spring may be biased to pull the slidable wing attachment 326 toward the wing root 332. In such examples, a user could pull the slidable wing attachment 326 out from the wing root 332 and in so doing, elongate the tension spring 370 or other elastomeric device. In that example the tension spring 370 would be pulling the wing root 332 and slidable wing attachment 326 toward one another, and when released by a user, the tension spring 370 could then slide the rods 350, 352 into the receiving holes 360, 362 of the wing root 332. If the bracket 384 of the free wing 324 portion is inserted into the wing root 332, the rods 350, 352 could also slide into the holes 380, 382 on the free wing 324 portion, thereby securing the free wing portion 324 to the wing root 332. In the quick connect examples described below, the bracket 384 of the free wing 324 may include a curve or wedge shaped element 385 with a notch cut in it. The wedge shaped element 385 may engage the guide post 338 of the slidable wing attachment 326 to push the slidable wing attachment 326 away from the wing root 322 when the two parts are pushed together. As explained below, when the guide post 338 engages the notch in the wedge shaped element 385 of the bracket 384, the guide post 338 is able to move again toward the wing root 322 by the tension spring 370 thereby pulling the rods 350, 352 through the holes 360, 362 and the gap 374 to secure the free wing 324 to the wing root 322.

In examples where a tension spring 370 system is used to pull the wing root 332 and the slidable wing portion 326 together, a spring hole 376 or cavity could be formed in either the wing root 332 and/or slidable wing portion 326 to allow for a flush joining of the wing root 332 and slidable wing portion 326. In such examples, the tension spring 370 could be mounted by a hook 372 or other attachment to the inside of the tension spring hole 376 and the wing root 332. In the example of FIG. 3, the spring 370 is shown with a spring hole 376 in the slidable wing attachment portion 326 but the spring hole 376 could be built into either wing portion, or into both portions, to allow for the spring 370 or other elastomeric device to fully draw the wing root 332 and slidable wing portion 326 flush together.

The FIG. 3 example of a single elastomeric device 370 is not intended to be limiting. Any number of elastomeric devices could be used in any number such as one, two, three or four elastomeric devices to pull the wing root 332 and the slidable wing portion 326 together. The example of a coiled metal spring as the elastomeric device 370 is also just an example, and any kind of biased system or elastomeric device could be used such as an elastic band system, one or more spinning coiled systems, a pulley system, a piston system such as a hydraulic piston, a coiled tension spring or other biasing devices could be used to help pull the slidable wing attachment portion 326 together toward the wing root 322. In some embodiments, magnets may be mounted to the various component parts and used to either secure the component parts together, or augment other elastomeric devices to aid in structural mounting support. Such magnets could be mounted on surfaces such as the button 386 and button cavity 388 or could be flush mounted in the surface of the wing root 322 and free wing section 324 and/or the slidable wing attachment section 326.

Referring still to FIG. 3, in some examples, electrical connectors could be arranged on the wing portions 332, 324, 326 that could allow control of flight controls such as ailerons or other electrical components on the wing 324. In such examples, the fuselage where the wing root 332 is attached, could include computers, batteries, controllers, and other components that could be electrically connected to servo motors that control flight control surfaces such as ailerons, an elevator, a rudder, etc. Other features such as cameras, antennae, GPS, lights or other features could also require electrical connections. In such examples, electrical leads could be arranged on each side of the wing portions so that when assembled, the electrical leads touch one another and the signals could flow to the electrical features and subcomponents. In such a way, an operator would not have to connect any wires separately from merely connecting the wing 324 to the wing root 332 using the slidable wing attachment 326. In some examples, the wing buttons 386 and matching button cavities 388 could include electronic connectors.

Quick Connect Examples

Figure 4:
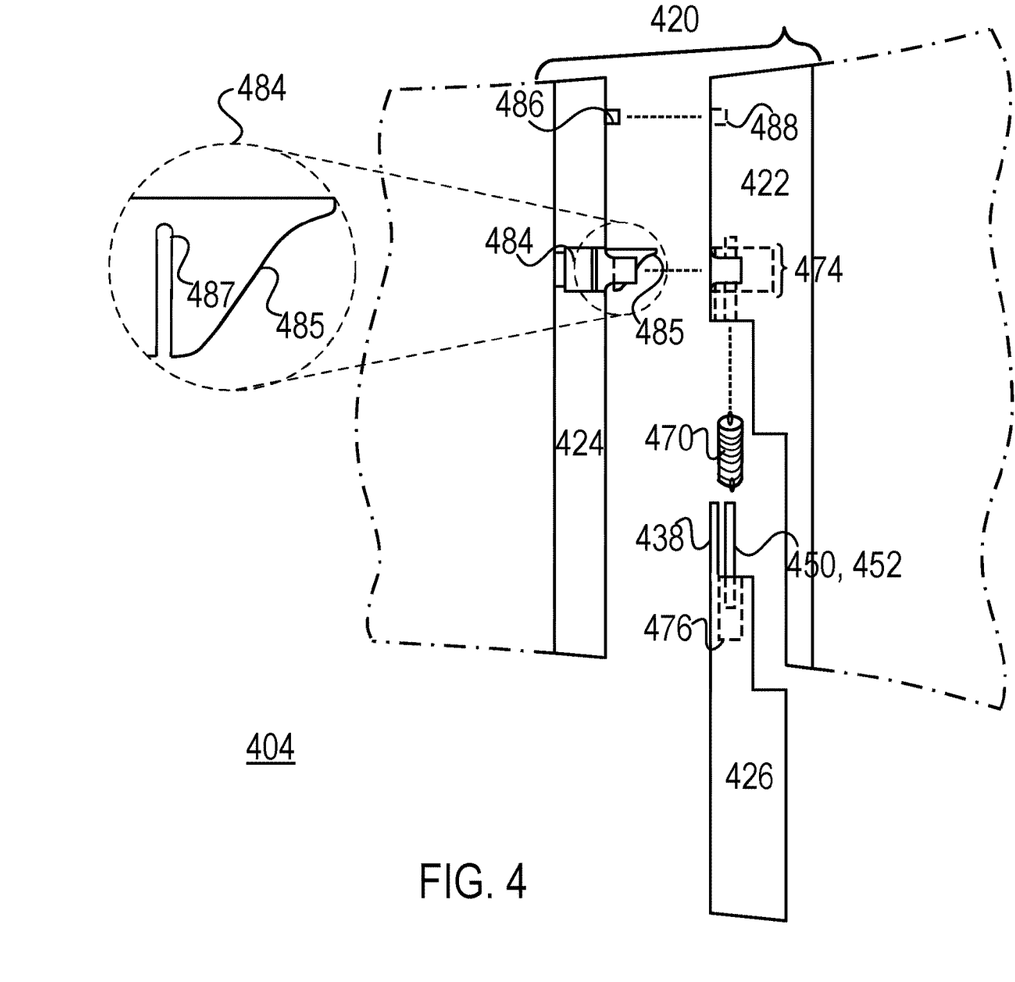
FIG. 4 is a top down illustration of a disassembled wing spar assembly according to some embodiments described here.

FIG. 4 shows a top down view of an exploded wing attachment assembly 420 and shows the slidable wing attachment 426 with rod 450, 452 as well as tension spring 470 and how in some embodiments it may be arranged to fit into the wing root 422 and free wing 424 sections. The bracket 484 on the free wing section 424 is also shown along with the position it can slide into the wing root 422 at a gap 474 so as to engage the rods 450, 452 when the slidable wing attachment 426 is slid into place in an assembled wing 404. The tension spring 470 is shown disengaged from the wing root 422 and the slidable wing attachment 426 but in an assembled embodiment would be attached to both the wing root 422 and slidable wing attachment 426 to impart a force to hold or bias the slidable wing attachment 426 toward the wing root 422, thereby holding the rods 450, 452 into the holes in the wing root 422 and holding the bracket 484 and thereby the free wing 424 when assembled. Slideable wing attachment 426 also shows an example spring hole or cavity 476 for the tension spring 470 to fit in and attach to.

In some example embodiments, the free wing 424 may be connected to the wing root 422 by a quick connection. Such a quick connection may allow a user to snap a free wing 424 onto the wing root 422 by pushing the two component parts together using the tension spring 470 in the slidable wing section 426 to hold the component parts together.

As described above, the tension spring 470 in the slidable wing attachment 426 exerts a force, pulling the slidable wing attachment 426 and the rods 450, 452 toward the wing root 422 including the rods 450, 452 into the gap 474 on the wing root 422. In the quick connection example embodiment, instead of a user placing a hand on the slidable wing attachment 426, to pull the rods 450, 452 out of the gap 474, and elongate the tension spring 470, when the bracket 484 is pushed into the wing root 422 gap 474, a wedge-shaped or curved surface 485 on the free wing 424 bracket 484 exerts a force on the guide post 438. Thus, the curved surface 485 of the free wing 424 bracket 484 pushes the guide post 438 and the slidable wing attachment 426 and moves the rods 450, 452 out of the gap 474 away from the wing root 422 until the guidepost 438 reaches a notch 487 in the curved surface 485 of the bracket 484 curved surface 485. When the guidepost 438 reaches the notch 487 on the curved surface 485 as the component parts are pushed together, the force from the tension spring 470 pulls the slidable wing attachment 426 back toward the wing root 422 and thereby the rods 450, 452 through the holes in the bracket 484 to secure the free wing 424 to the wing root 422. This quick connect mechanism may allow for one-handed operation, and allow the user to snap a free wing 424 onto the wing root 422 by pushing the two parts together.

Still discussing the example in FIG. 4, a button 486 is shown on the free wing 424 and a matching button cavity 488 on the wing root 422. These features may be positioned anywhere along the wing root 422 and free wing 424 sections in order to provide support when the two wing sections are assembled. The button 486 and matching button cavity 488 could also be located on opposite parts of the wing assemblies, and some embodiments may include buttons 486 on both sections, and matching button cavities 488 on both sections. Such buttons 486 and button cavities 488 could be any shape and size and may slide together, or may attach in other ways such as but not limited to magnetic attachment, snaps, click, friction fit, or other attachment.

The example embodiment of FIG. 4 shows an embodiment where at least one rod 450 is used to provide structural support for the mounting of the components. In the example the rod 450 is mounted to the slidable wing attachment 426 and is mounted so that it may slide into the wing root 422 to secure the free sing 424 section to the wing root 422. The example embodiment shows a coiled tension spring 470 which is used to exert a force to pull the wing root 422 and the slidable wing attachment 426 together, guided by the rod 450. When mounting the free wing section 424 to the wing root 422, the free wing bracket 484 may fit into the free space 474 on the wing root 422 and the rod 450 on the slidable wing attachment 426 may then slide through a hole in the bracket 484 to secure the free wing 424 to the wing root 422. The spring or other elastomeric device 470 may then hold the portions 422, 424, 426 together.

Figure 5:
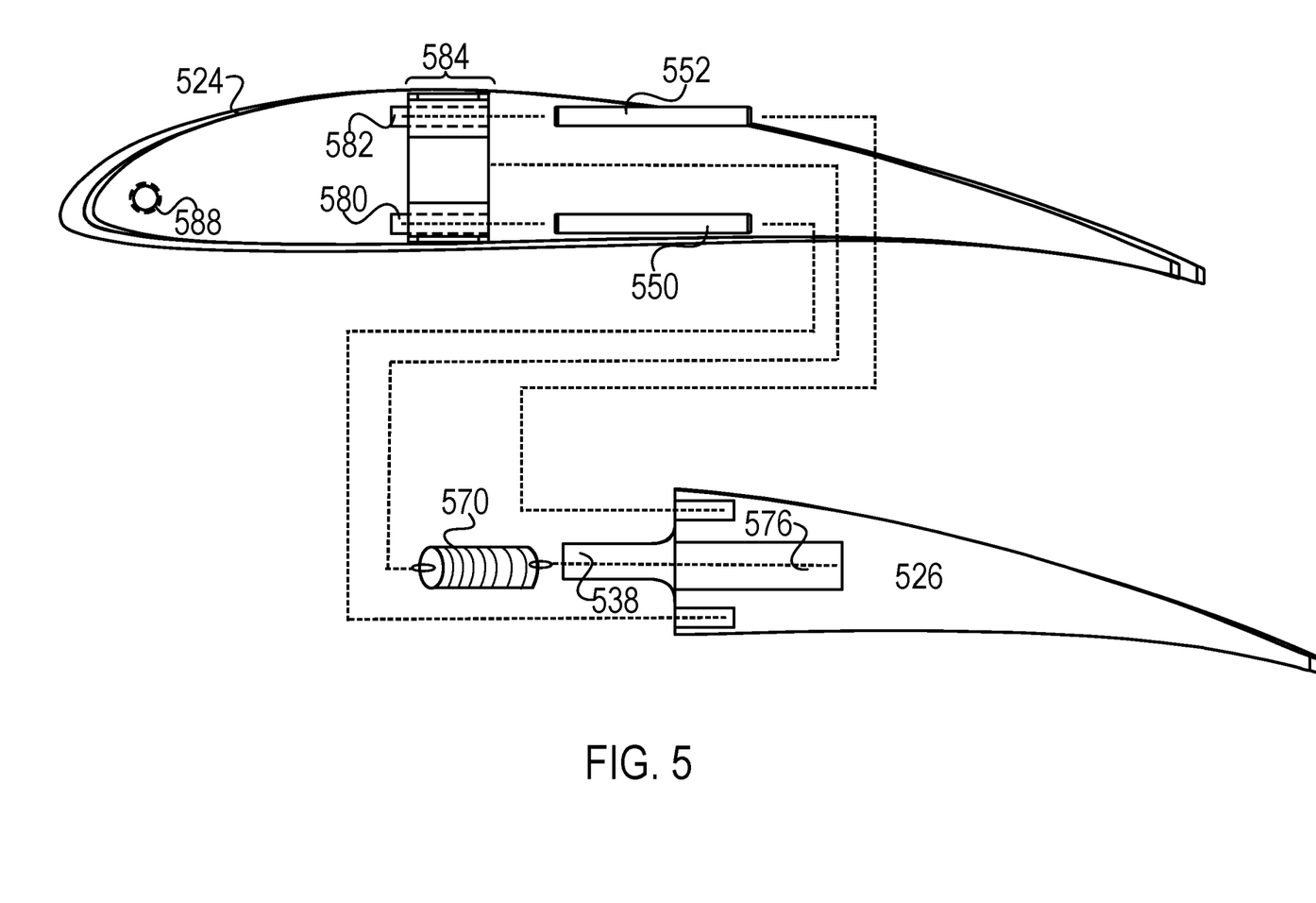
FIG. 5 is a side view of a disassembled wing spar assembly according to some embodiments described here.

Turning now to the example of FIG. 5, the figure shows an example side view of the slidable wing attachment 526 and the free wing section 524 along with the connecting rods 550, 552. FIG. 5 shows an example where the rods 550, 552 engage the matching holes 580, 582 in the free wing section 524 when the slidable wing attachment section 526 is in the forward position on the wing root (not shown). Also shown in FIG. 5 is an example guide 538 on the slidable wing attachment 526 as described herein. FIG. 5 also shows an elastomeric connection, in this case a tension spring 570 and corresponding spring hole 576 in the slidable wing attachment 526. The spring 570 may be mounted inside the spring hole or cavity 576 and also to the wing root (not shown) in order to impart a pulling force that would draw the wing root (not shown) toward the slidable wing attachment section 526 and thereby pull the rods 550, 552 through the holes in the wing root (not shown) and the holes 580, 582 in the bracket 584 mounted to the free wing 524. FIG. 5 also shows an example button cavity 588 in the wing free wing 524 section.

Conclusion

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although some presently preferred implementations of the embodiments have been specifically described herein, it will be apparent to those skilled in the art to which the embodiments pertains that variations and modifications of the various implementations shown and described herein may be made without departing from the spirit and scope of the embodiments. Accordingly, it is intended that the embodiments be limited only to the extent required by the applicable rules of law.

What is claimed is:

1. A wing assembly, comprising:
   a wing root connected to an aircraft fuselage, the wing root having a leading edge, a trailing edge, a protrusion forming a cut out space, the protrusion having at least two holes;
   a free wing section with a bracket, the bracket formed to fit into the cut out space, wherein the bracket includes at least two holes;
   a slidable wing attachment section formed to fit between the wing root and the free wing section; and
   an elastomeric retention device coupled to the wing root and the slidable wing attachment section, the elastomeric retention device configured to exert a force to pull the slidable wing attachment section towards the wing root.

2. The wing assembly of claim 1, wherein the elastomeric retention device is a coiled tension spring.

3. The wing assembly of claim 1, wherein the wing root includes a button protrusion and the free wing section includes a button cavity configured to mate with the button protrusion.

4. The wing assembly of claim 1, wherein the slidable wing attachment section includes two rods formed to fit into the at least two holes in the wing root and the at least two holes in the bracket.

5. The wing assembly of claim 1, wherein the elastomeric retention device is a hydraulic tension piston.

6. The wing assembly of claim 1, wherein the elastomeric retention device is configured to pull the slidable wing attachment section towards the leading edge of the wing root.

7. The wing assembly of claim 1, wherein the elastomeric retention device is configured to pull the slidable wing attachment section towards the trailing edge of the wing root.

8. The wing assembly of claim 4, wherein the bracket includes a wedge configured to force the slidable wing attachment section away from the wing root to facilitate insertion of the two rods into the at least two holes in the bracket.

\* \* \* \* \*